(12) United States Patent
Scheer et al.

(10) Patent No.: US 11,162,857 B2
(45) Date of Patent: Nov. 2, 2021

(54) TORQUE-ANGLE SENSOR

(71) Applicant: Robert Bosch GmbH, Stuttgart (DE)

(72) Inventors: Mirko Scheer, Jiangsu (CN); Xiang Li, Jiangsu (CN); Gaofeng Liang, Jiangsu (CN)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/953,854

(22) Filed: Nov. 20, 2020

(65) Prior Publication Data

US 2021/0164852 A1 Jun. 3, 2021

(30) Foreign Application Priority Data

Nov. 29, 2019 (CN) .......................... 201922103487.7

(51) Int. Cl.
| | |
|---|---|
| *G01L 5/00* | (2006.01) |
| *G01L 5/22* | (2006.01) |
| *G01D 11/24* | (2006.01) |
| *G01L 3/10* | (2006.01) |
| *B62D 15/02* | (2006.01) |

(52) U.S. Cl.
CPC .......... *G01L 5/221* (2013.01); *B62D 15/0215* (2013.01); *G01D 11/245* (2013.01); *G01L 3/101* (2013.01)

(58) Field of Classification Search
CPC ..... G01L 5/221; G01L 3/101; B62D 15/0215; G01D 11/245
See application file for complete search history.

(56) References Cited

U.S. PATENT DOCUMENTS

| | | | |
|---|---|---|---|
| 6,720,762 B2 * | 4/2004 | Okumura | ............... G01D 5/145 324/207.21 |
| 8,963,543 B2 * | 2/2015 | Moldenhauer | .......... F16C 27/04 324/207.25 |
| 10,259,499 B2 * | 4/2019 | Adachi | ................ B60R 16/027 |

* cited by examiner

*Primary Examiner* — Jamel E Williams
(74) *Attorney, Agent, or Firm* — Maginot, Moore & Beck LLP

(57) ABSTRACT

A torque-angle sensor is mounted on a steering column with a system casing and configured to detect a steering torque and angle of steering wheel steering of a vehicle. The torque-angle sensor includes a top cover, a torque sensing unit, an angle sensing unit, a PCB, a signal output terminal, and a sensor casing. The top cover includes a body, a first fitting part, and second fitting part. The first fitting part is a flange extending from the body towards the sensor casing, and fitted to the sensor casing. The second fitting part is a flange extending in a radial direction and/or axial direction of the body, and fitted to the system casing. In a radial direction of the body, a distance between the second fitting part and a center of the body is greater than a distance between the first fitting part and the center of the body.

10 Claims, 4 Drawing Sheets

TORQUE-ANGLE SENSOR

This application claims priority under 35 U.S.C. § 119 to patent application no. CN 201922103487.7, filed on Nov. 29, 2019 in China, the disclosure of which is incorporated herein by reference in its entirety.

BACKGROUND

The disclosure relates to a sensor, an integrated torque-angle sensor configured to monitor a steering situation of a vehicle.

A torque-angle sensor integrates and combines a torque sensor and an angle sensor, and is used to measure the angle of rotation of a vehicle steering wheel and the size of the torque to which the vehicle steering wheel is subjected. An existing torque-angle sensor has a cover, a torque measurement module, an angle measurement module, a connector and a housing. During use, the torque-angle sensor is mounted on a steering column of the steering wheel, and in order to protect the torque-angle sensor, an outer housing and an outer cover that are fitted together are also provided on the steering column, for the purpose of receiving and protecting the torque-angle sensor; an input transfer connector and an output transfer connector are provided on the outer cover, wherein the input transfer connector is configured to be electrically connected to the connector of the torque-angle sensor, and the output transfer connector is electrically connected to an electronic control apparatus via having connectors provided at two ends, so as to transmit a signal of the torque-angle sensor to the electronic control apparatus.

SUMMARY

In view of the above, the disclosure provides a torque-angle sensor, which can simplify a mounting process.

First of all, according to one aspect of the disclosure, it provides a torque-angle sensor, mounted on a steering column provided with a system casing, and configured to detect a steering torque and angle of steering wheel steering of a vehicle, the torque-angle sensor comprising a top cover, a torque sensing unit, an angle sensing unit, a PCB, a signal output terminal and a sensor casing, with a receiving space being formed between the top cover and the sensor casing, for the purpose of receiving the angle sensing unit, the PCB and the signal output terminal; the top cover comprising a body and a first fitting part, the first fitting part being a flange extending from the body towards the sensor casing, and being configured to be fitted to the sensor casing; the top cover comprises a second fitting part, the second fitting part being a flange extending in a radial direction and/or axial direction of the body, and being configured to be fitted to the system casing, wherein, in the radial direction of the body, the distance between the second fitting part and the centre point of the body is greater than the distance between the first fitting part and the centre point of the body.

According to a feasible embodiment, the first fitting part is a continuous annular flange protruding and extending from the body towards the sensor casing, or the first fitting part is several discontinuous flanges protruding and extending from the body towards the sensor casing.

According to a feasible embodiment, at least one of a snap-fit member, an engagement groove, a screw hole, adhesive and/or welding material is provided on the first fitting part, for fitting to a flange of the sensor casing.

According to a feasible embodiment, the second fitting part is a continuous or discontinuous flange extending from an edge of the body in the radial direction and/or axial direction of the body, and at least one of a snap-fit member, an engagement groove, a screw hole and/or adhesive is provided on the second fitting part, for fitting to the system casing.

According to a feasible embodiment, the second fitting part is a continuous or discontinuous flange extending from an edge of the body in the axial direction of the body, and is pressed in directly in an interference fit, thereby being fitted to the system casing.

According to a feasible embodiment, a sealing member is provided between the top cover and the system casing.

According to a feasible embodiment, the body is substantially a flat plate, and is provided with a through-hole fitting the steering column of the vehicle and a signal output socket for receiving the signal output terminal.

According to a feasible embodiment, the torque sensing unit comprises a signal input rotor and a signal output rotor, the signal input rotor comprising a protrusion disposed at one end and a first fan blade set disposed at another end, and the signal output rotor comprising a second fan blade set.

According to a feasible embodiment, the angle sensing unit comprises a middle gear and a sensing gear with a magnet, wherein the middle gear is meshed with the sensing gear.

According to a feasible embodiment, the middle gear is fitted round and fixed to the protrusion of the signal input rotor; the signal input rotor and middle gear are fixed together by a connection method of welding, insert injection moulding and/or pressing in.

Compared with the prior art, since the top cover of the sensor of the disclosure is provided with the second fitting part, when assembly is performed, the top cover is fitted to the system casing via the second fitting part, dispensing with a system top cover and a transfer connector required by the system top cover in the prior art, and thus reducing the number of system mounting components and simplifying the mounting process, thereby lowering costs and increasing the assembly efficiency.

BRIEF DESCRIPTION OF THE DRAWINGS

A more comprehensive understanding of the abovementioned and other aspects of the disclosure will be gained from the following detailed description which refers to the drawings. The drawings comprise.

DETAILED DESCRIPTION

The disclosure is described in detail below by means of demonstrative embodiments.

Some exemplary embodiments of the disclosure are described in greater detail below with reference to the drawings, in order to better understand the basic idea and advantages of the disclosure.

Figure 1:
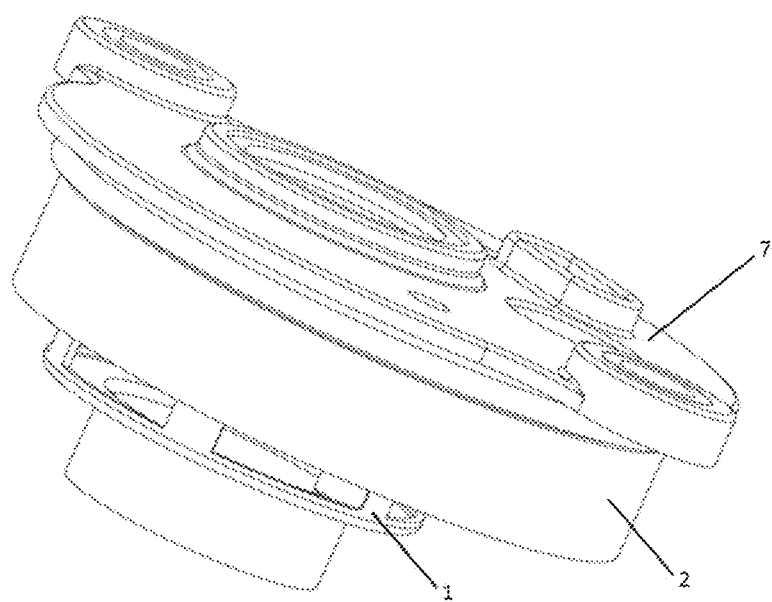
FIG. 1 shows a three-dimensional schematic drawing of a torque-angle sensor configured to detect a steering torque and angle of steering wheel rotation.
Figure 2:
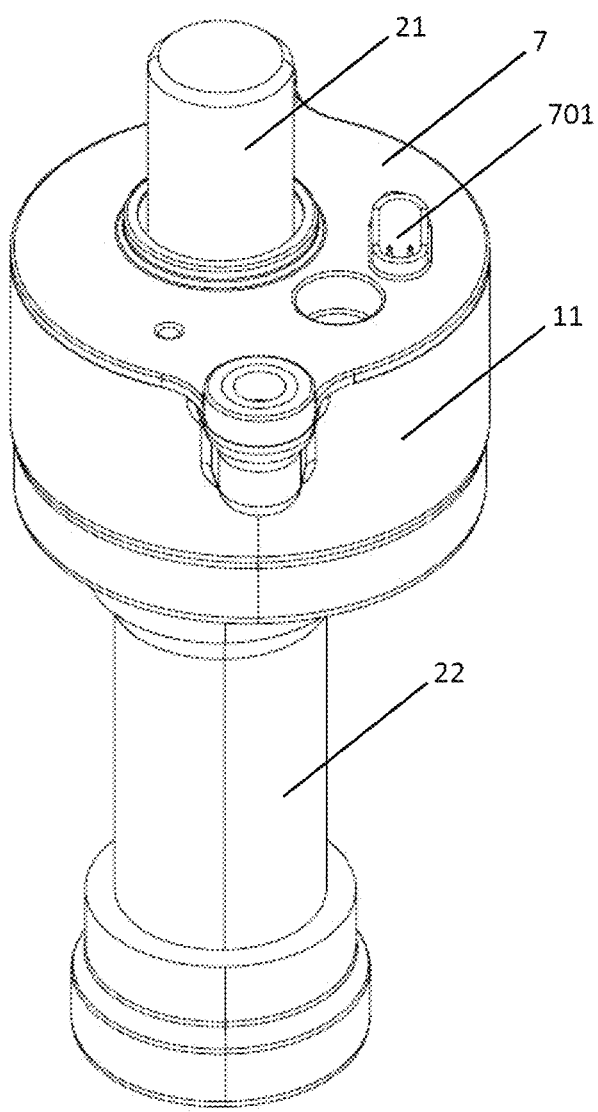
FIG. 2 shows a three-dimensional schematic assembly drawing of a steering column of a vehicle and the torque-angle sensor shown in FIG. 1.
Figure 3:
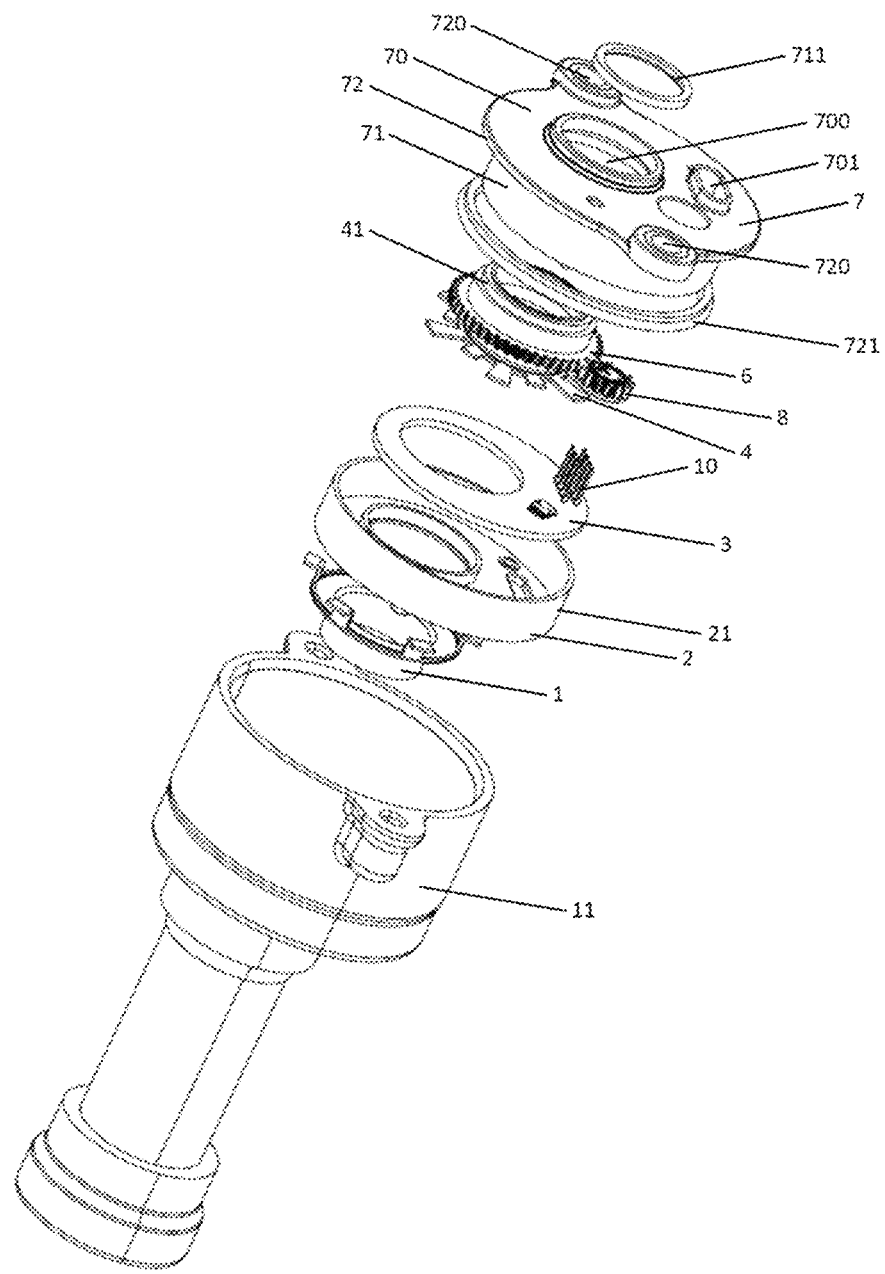
FIG. 3 shows a three-dimensional exploded schematic drawing of FIG. 2, in which an input shaft and torsion bar of the vehicle steering column are not shown.
Figure 4:
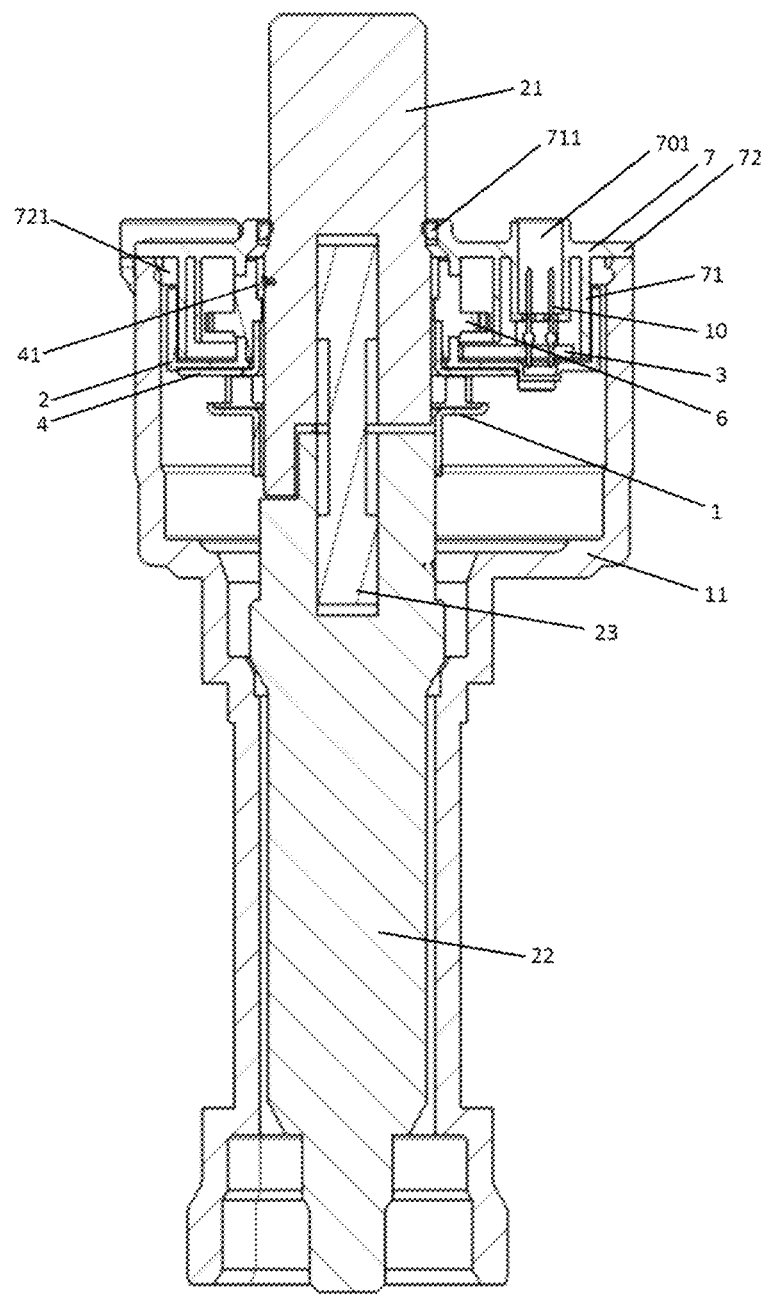
FIG. 4 shows a sectional schematic view of FIG. 2.

Referring to FIGS. 1-4, a steering column of a vehicle comprises an input shaft 21 from a steering wheel (not shown), an output shaft 22 to a steering shaft connector (not shown), and a torsion bar 23 connected between the input shaft 21 and the output shaft 22. When the steering wheel is subjected to a force, the torsion bar 23 experiences deformation; using known mechanical characteristics of the material of the torsion bar 23, a steering torque of steering wheel steering can be determined on the basis of a relative rotation angle of the input shaft 21 relative to the output shaft 22, and this relative rotation angle can characterize the torsional deformation of the torsion bar 23.

A torque-angle sensor in an embodiment of the disclosure is mounted on the steering column provided with a system casing 11, and configured to detect the steering torque and angle of vehicle steering wheel steering; the torque-angle sensor comprises a top cover 7, a torque sensing unit, an angle sensing unit, a PCB 3, a signal output terminal 10 and a sensor casing 2; a receiving space is formed between the top cover 7 and the sensor casing 2, and configured to receive the angle sensing unit, the PCB 3 and the signal output terminal 10. The top cover 7 comprises a body 70, a first fitting part 71 and a second fitting part 72; the first fitting part 71 is a flange extending from the body 70 towards the sensor casing 2, and is configured to be fitted to the sensor casing 2; the second fitting part 72 is a flange extending in a radial direction and/or axial direction of the body 70, and is configured to be fitted to the system casing 11, for the purpose of protecting other components of the sensor of the disclosure; in the radial direction of the body 70, the distance between the second fitting part 72 and the centre point of the body 70 is greater than the distance between the first fitting part 71 and the centre point of the body 70.

The body 70 is substantially a flat plate, and is provided with a through-hole 700; the steering column of the vehicle passes through the through-hole 700, and the body 70 and steering column are rotatably fitted together, such that the torque-angle sensor of the disclosure is rotatably mounted on the steering column of the vehicle; in this embodiment, the input shaft 21 passes through the through-hole 700. Optionally, depending on actual sealing requirements, a sealing member 711 may be provided between the top cover 7 and the steering column. A signal output socket 701 is provided on the body 70, and is configured to receive the signal output terminal 10, so as to establish an electrical connection with a control apparatus (not shown).

In this embodiment, the first fitting part 71 is a continuous annular flange protruding and extending from the body 70 towards the sensor casing 2; depending on actual mounting needs, at least one of a snap-fit member, an engagement groove, a screw hole, adhesive and/or welding material (not shown) may be provided on the first fitting part 71, for fitting to the flange 21 of the sensor casing 2. As will be understood, in other embodiments, the first fitting part 71 is several discontinuous flanges protruding and extending from the body 70, as long as these flanges can be fitted to the flange 21 of the sensor casing 2.

In this embodiment, the second fitting part 72 is a continuous or discontinuous flange extending from an edge of the body 70 in the radial direction of the body 70. When assembly is performed, an edge of the system casing 11 abuts the second fitting part 72, and at least one of a snap-fit member, an engagement groove, a screw hole and/or adhesive (not shown) may be provided on the second fitting part 72, for fitting to the system casing 11; alternatively, when the second fitting part 72 is a continuous or discontinuous flange extending from an edge of the body 70 in the axial direction of the body 70, the second fitting part 72 is pressed in directly in an interference fit, thereby being fitted to the system casing 11. In this embodiment, the second fitting part 72 is provided with at least one screw hole 720, and correspondingly, at least one screw hole is also provided on the system casing 11; when assembly is performed, the system casing 11 abuts the second fitting part 72, and the system casing 11 and top cover 7 are fitted together by means of a screw (not shown). Optionally, depending on actual sealing requirements, a sealing member 721 may be provided between the top cover 7 and the system casing 11.

The torque sensing unit comprises a signal input rotor 4 and a signal output rotor 1; the signal input rotor 4 comprises a first fan blade set, and the signal output rotor 1 comprises a second fan blade set. The signal input rotor 4 and signal output rotor 1 are configured to be disposed on mutually opposite ends of the input shaft 21 and output shaft 20 respectively; specifically, the signal input rotor 4 is fitted round the input shaft 21 and rotates coaxially with the input shaft 21, and the signal output rotor 1 is fitted round the output shaft 22 and rotates coaxially with the output shaft 22, such that a torque between the input shaft 21 and output shaft 22 can be converted to a torque between the signal input rotor 4 and signal output rotor 1, and the steering wheel steering torque can be measured by measuring the torque between the signal input rotor 4 and signal output rotor 1. Depending on actual mounting needs, the signal input rotor 4 and/or signal output rotor 1 is/are fitted between or outside the top cover 7 and the sensor casing 2.

In this embodiment, the PCB 3 is fitted round the input shaft 21, and the PCB 3 comprises a magnetic field generating component and two first chips (not shown in the figure); when the signal input rotor 4 and signal output rotor 1 rotate, the first fan blade set of the input rotor 4 and the second fan blade set of the signal output rotor 1 will cut the magnetic field generated by the PCB; the first chips on the PCB 3 sense a rotation angle of the first fan blade set of the signal input rotor 4 and the second fan blade set of the signal output rotor 1 by the principle of electromagnetic induction, and multiply this by a torsion bar coefficient, outputting two crossed torque and angle signals to a control unit via the signal output terminal 10. The PCB 3 may also employ another conventional method, such as resistance strain sensing, inductive sensing, capacitive sensing, piezoelectric sensing, photoelectric sensing or Hall sensing, to sense an angle signal of the signal input rotor 4 and the signal output rotor 1.

The angle sensing unit comprises a middle gear 6 and a sensing gear 8 with a magnet, wherein the middle gear 6 is fitted round and fixed to the signal input rotor 4, and is meshed with the sensing gear 8, wherein a protrusion 41 is provided at one side of the signal input rotor 4, and the middle gear 6 is fitted round and fixed to the protrusion 41 of the signal input rotor 4; the signal input rotor 4 and middle gear 6 may be fixed together by a connection method such as welding, insert injection moulding or pressing in. The PCB 3 comprises two second chips (not shown in the figure); when the rotation angle of the input/output shaft is greater than 360 degrees, and the middle gear 6 drives the sensing gear 8, the second chips will perceive and calculate the position of the sensing gear 8 and output a number-of-turns following signal to an ECU control unit; this signal and an initial rotation angle signal calculated by the first chips are coupled via a Nonius algorithm inside the ECU to calculate the final required precise angle signal.

Since the top cover of the sensor of the disclosure is provided with the second fitting part, when assembly is performed, the top cover is fitted to the system casing via the second fitting part, dispensing with a system top cover and a transfer connector required by the system top cover in the prior art, and thus reducing the number of system mounting components and simplifying the mounting process, thereby lowering costs and increasing the assembly efficiency.

Although the disclosure has been explained and described here with reference to specific embodiments, the disclosure is not limited to the details shown. These details may be amended in various ways within the scope of the disclosure.

What is claimed is:

1. A torque-angle sensor configured to be mounted on a steering column with a system casing and to detect a steering torque and angle of steering wheel steering of a vehicle, the torque-angle sensor comprising:
    a top cover, a torque sensing unit, an angle sensing unit, a PCB, a signal output terminal, and a sensor casing,
    wherein the top cover and the sensor casing define a receiving space configured to receive the angle sensing unit, the PCB, and the signal output terminal,
    wherein the top cover includes:
        a body and a first fitting part, the first fitting part configured (i) as a flange extending from the body towards the sensor casing and (ii) to be fitted to the sensor casing, and
        a second fitting part configured (i) as a flange extending in one or more of a radial direction and an axial direction of the body and (ii) to be fitted to the system casing, and
    wherein, in the radial direction of the body, a distance between the second fitting part and the centre point of the body is greater than a distance between the first fitting part and the centre point of the body.

2. The torque-angle sensor according to claim 1, wherein the first fitting part is (i) a continuous annular flange protruding and extending from the body towards the sensor casing or (ii) several discontinuous flanges protruding and extending from the body towards the sensor casing.

3. The torque-angle sensor according to claim 1, wherein at least one of a snap-fit member, an engagement groove, a screw hole, adhesive, and welding material is disposed on the first fitting part so as to fit to a flange of the sensor casing.

4. The torque-angle sensor according to claim 1, wherein the second fitting part is a continuous or discontinuous flange extending from an edge of the body in one or more of the radial direction and the axial direction of the body, and wherein at least one of a snap-fit member, an engagement groove, a screw hole, and adhesive is disposed on the second fitting part so as to fit to the system casing.

5. The torque-angle sensor according to claim 4, wherein the second fitting part is a continuous or discontinuous flange extending from an edge of the body in the axial direction of the body, the second fitting part configured to be pressed in directly in an interference fit, thereby being fitted to the system casing.

6. The torque-angle sensor according to claim 1, further comprising a sealing member disposed between the top cover and the system casing.

7. The torque-angle sensor according to claim 1, wherein the body is substantially a flat plate that includes a through-hole configured to fit the steering column of the vehicle and a signal output socket configured to receive the signal output terminal.

8. The torque-angle sensor according to claim 1, wherein the torque sensing unit includes a signal input rotor and a signal output rotor, the signal input rotor including a protrusion disposed at a first end and a first fan blade set disposed at a second end, and the signal output rotor including a second fan blade set.

9. The torque-angle sensor according to claim 8, wherein the angle sensing unit includes a middle gear and a sensing gear with a magnet, and wherein the middle gear is meshed with the sensing gear.

10. The torque-angle sensor according to claim 9, wherein the middle gear is fitted round and fixed to the protrusion of the signal input rotor, and wherein the signal input rotor and middle gear are fixed together by a connection defined by one or more of welding, insert injection moulding, and pressing in.

* * * * *